(12) United States Patent
Sano et al.

(10) Patent No.: US 6,542,333 B1
(45) Date of Patent: Apr. 1, 2003

(54) CONTROLLING THE GENERATION OF CRACKS AND BREAKAGE IN A MAGNETIC HEAD

(75) Inventors: Akinobu Sano, Iwata-gun (JP); Masayuki Iwakura, Iwata-gun (JP)

(73) Assignee: Minebea Co., Ltd., Kitasaku-gun (JP)

( * ) Notice: Subject to any disclaimer, the term of this patent is extended or adjusted under 35 U.S.C. 154(b) by 0 days.

(21) Appl. No.: 09/562,764

(22) Filed: May 2, 2000

(30) Foreign Application Priority Data

Nov. 26, 1999 (JP) .......................... 11-336086

(51) Int. Cl.[7] .......................... G11B 5/105; G11B 15/64
(52) U.S. Cl. .......................... 360/234.9
(58) Field of Search .......................... 360/234.9, 234.8, 360/234.7, 125, 129; G11B 5/105, 5/265

(56) References Cited

U.S. PATENT DOCUMENTS

| | | | | |
|---|---|---|---|---|
| 5,151,837 A | * | 9/1992 | Wakasugi et al. ........ | 360/234.9 |
| 5,457,871 A | * | 10/1995 | Wakasugi et al. ........... | 360/122 |
| 5,459,629 A | * | 10/1995 | Wakasugi .................... | 360/104 |
| 5,624,730 A | * | 4/1997 | Wakasugi et al. ........... | 428/134 |
| 5,629,821 A | * | 5/1997 | Wakasugi et al. ........... | 360/125 |
| 5,889,642 A | * | 3/1999 | Egawa et al. ................ | 360/125 |
| 5,963,402 A | * | 10/1999 | Egawa et al. ................ | 360/125 |

* cited by examiner

Primary Examiner—William Korzuch
Assistant Examiner—Christopher R Beacham
(74) Attorney, Agent, or Firm—Oliff & Berridge, PLC

(57) ABSTRACT

The second inner wall 30b and the fourth inner wall 30d of the hole 5 of the slider 4 comprises the second and the fourth projections 31b and 31d, and the first inner wall 30a is not provided with a projection and is inclined to the vertical surface 50 at an angle θ. The raising portions of the second projection 31b and the fourth projection 31d is made in the radius curvature portion 51. Since, at the time of insertion of the front core 8 into the hole 5, side portion 8e of the front core 8 abuts to the first inner wall 30a at one line, the front core 8 is positioned precisely by the pushing force of the front core 8 in the A direction, and by application of a provisional adhesive to near B portion and near fourth projection 31d. At the time of extracting of the die after molding the slider 4, the concentration of the internal stress to the radius curvature portion 51 is avoided, and the generation of the defects such as lacking and cracking are controlled to increase the reliability, reduce the defective rate of the product, to increase the productivity and to realize the cost down.

10 Claims, 9 Drawing Sheets

CONTROLLING THE GENERATION OF CRACKS AND BREAKAGE IN A MAGNETIC HEAD

BACKGROUND OF THE INVENTION

1. Field of the Invention

This invention relates to a magnetic head for use of a floppy disc drive (FDD) and a hard disc drive (HDD).

2. Prior Art

As an example of a conventional magnetic head, what is shown in FIGS. 9 to 11 have been known.

In FIGS. 9 and 10, a magnetic head 1 is formed in general with an approximately rectangular slider 4 having rail portions 2, 3 (hereinafter called as the first and the second rail one side of which slides on a magnetic recording medium (not shown)), an approximately rectangular opening 5 formed in the first rail 2 of the slider 4, a front core 8 having an operation gap (a gap 6 for recording and reproducing and a gap 7 for erasing) which is sealed with a glass etc. to be filled in the hole 5, a back yoke 10 made of a magnetic materials to form a head core 9 with the front core 8 by being connected to the front core 8, a coil 11 for reproducing and a coil 12 for erasing coupled with the leg portions (the first, the second leg portions 23, 25).

Between the first rail 2 and the second rail 3 of the slider 4, a groove 13 is formed.

The front core 8 is formed in general, as shown in FIG. 11, with a first core body 14 one side of which comprises a gap 6 for recording and reproducing, a second core body 15 which comprises gaps 7 for erasing which is connected to the first core body 14, and that is configured approximately rectangular in such a manner as it can be inserted in the hole 5.

In this type of the magnetic head 1, in the hole 5 the front core 8 as apart of the head core 9 is inserted, the glass etc. is flown in the hole 5 and the front core 8 is sealed in the slider 4, and glass is filled between the front core 8 and the slider 4 so as to avoid it from forming a gap. This is for preventing the dust etc. from entering to deteriorate any property when any gap is formed.

If the inner wall of the hole 5 and the side of the front core 8 are flat each other like the above structure, at the time when the front core 8 is deflected in the hole 5, a gap between both becomes approximately tight, so that, the flowing of the glass becomes worse and the glass is insufficiently filled, and a trouble, in which a void not to be filled with glass is generated, occurs.

In order to prevent the glass from being insufficiently filled, as a method for a stable flowing of the glass, here is a magnetic head 1, in which, as shown in FIG. 12, on all of the inner wall of the hole 5 (first, second, third, fourth inner walls, 30a, 30b, 30c, 30d), projections (first, second, third, fourth projections 31a, 31b, 31c, 31d) are provided to keep a certain gap there between and secure an easily controlled flowing of the glass.

However, when projections are provided on all inner wall of the hole as the magnetic head of FIG. 12, there has occurred a problem in which, since the front core 8 is displaced free in the hole 5, it is difficult to make the front core 8 positioned properly.

In order to solve the above problem, the inventor has proposed a magnetic head shown in Japanese patent laid open No. Hei 10-154319. The magnetic head 1 shown in that publication is formed, as shown in FIG. 13, in such a manner as a height $H_1$ of the first projection 31a and the fourth projection 31d formed on the adjacent first inner wall 30a and the fourth inner wall 30d is settled lower than the height $H_2$ of the second projection 31b and the third projection 31c formed on the second inner wall 30b and the third inner wall 30c ($H_1 < H_2$).

According to thus structured magnetic head 1, the front core 8 is, at the time of sealing the glass flown, attracted by the first inner wall 30a and the fourth inner wall 30d due to the surface tension and aligned with the first and fourth inner wall 30a and 30d to be positioned properly.

Further, in this case, since on the first inner wall 30a and fourth inner wall 30d (the first projection 31a and the fourth projection 31d) are provided and between the first and fourth inner walls 30a, 30d and the front core 8 are kept with a given gap $G_{14}$, the glass will flow appropriately in the $G_{14}$ and is adapted to be controlled in glass filling lack.

However, in the magnetic head shown in FIG. 12 or 13, since there are provided with the projections (the first, the second, the third, the fourth projections, 31a, 31b, 31c, 31d) on all of the inner walls of the hole 5 (the first, the second, the third, the fourth inner walls, 30a, 30b, 30c, 30d), there will be a problem in which any lack or crack around the projections has been apt to be generated.

That is, in the magnetic head shown in FIG. 12 or 13, the hole 5 of the slider 4 is formed using a convex pin type of mold. And, after molding the slider 4, in accordance with some deflected amount (a deflected amount of the mold) due to the position and the inclination of the mold and the inclination at the time of extruding the mold, any internal stress is concentrated on the projection formed on the inner wall of the hole 5 and the corner portions at 4 corners, some breakages or cracks are apt to be generated. In this case, since there is a relation that as longer the distance from the center of the convex pin type of mold is, the larger the deflection amount of the mold is, a deflection amount of the short side (the first and the third inner walls 30a and 30c) becomes larger, which influences much against the short side, and the generation of the breakage or crack is outstanding at the short side (the first and the third inner walls 30a and 30c).

The above breakage and crack at the short side is led to the cause of a decrease of the reliability of the product, an increase of the defective rate of the product and a cost up for mass production, as a result, it has been a large obstacle for production.

Further, as a countermeasure against the breakage or crack at the short side, as shown in FIG. 14 and 15, by merely getting rid of the projection, as mentioned above, the short side wall and the side of the front core 8 become approximately tight, so that the gap between them is narrow to invite a lack of glass filling.

Further, the positioning of the front core 8 to the hole 5 at the time of inserting it to the hole 5, it is preferable to carry out at high precision in order to secure good recording and reproducing. However, in the above conventional art, for example as shown in FIG. 14 or FIG. 15, the front core 8 becomes inclined when being inserted in the hole 5 (for instance, refer to X axis of FIG. 14 or 15), which is apt to invite a generation of azimuth defect and has been no appropriately sufficient for the above demand.

The present invention has been made in the light of the above circumstances, the purpose thereof is to provide a magnetic head which can control the generation of any breakage or crack.

And, another purpose of the present invention is to prevent the glass from being filled insufficiently and increase the positioning precision of the front core at the time of being inserted in the hole.

According to a first aspect of the present invention, in a magnetic head which comprises a slider having a rail portion sliding on a magnetic recording medium, an approximately rectangular opening formed in the rail portion of the slider, a front core, one portion of which is inserted and sealed with a sealing agent, and having an operation gap, a back yoke which forms the head core with the front core and coils for recording, reproducing and erasing which are coupled with the leg portions of the back yokes, long side walls of 4 inner walls which form the hole have at least two stripes of projections extending in the coming through direction, and at least one of the two short side walls is inclined at a given angle against a vertical face normal to the long side walls.

According to a second aspect of the present invention, the given angle is an angle from one degree to 10 degrees.

According to a third aspect of the present invention, in a magnetic head which comprises a slider having a rail portion sliding on a magnetic recording medium, an approximately rectangular opening formed in the rail portion of the slider, a front core, one portion of which is inserted and sealed with a sealing agent, and having an operation gap, a back yoke which forms the head core with the front core and coils for recording, reproducing and erasing which are coupled with the leg portions of the back yokes, of 4 inner side walls the long side walls have at least two stripe of projections and at least one of two short sides is configured concave viewing from the rail portion.

According to a fourth aspect of the present invention, in any one aspect of the first to the third aspects, a raising portion of the long side wall is configured curved smooth.

According to fifth aspect of the present invention, in one aspect of from first to fourth aspect of the present invention, the front core is configured approximately rectangular in a plan view, it is inserted along with the longitudinal direction of the hole, and at the time of inserting, it is positioned by of four sides including four corners extending up and downward one side being abutted to the short side wall.

EMBODIMENT

Figure 9:
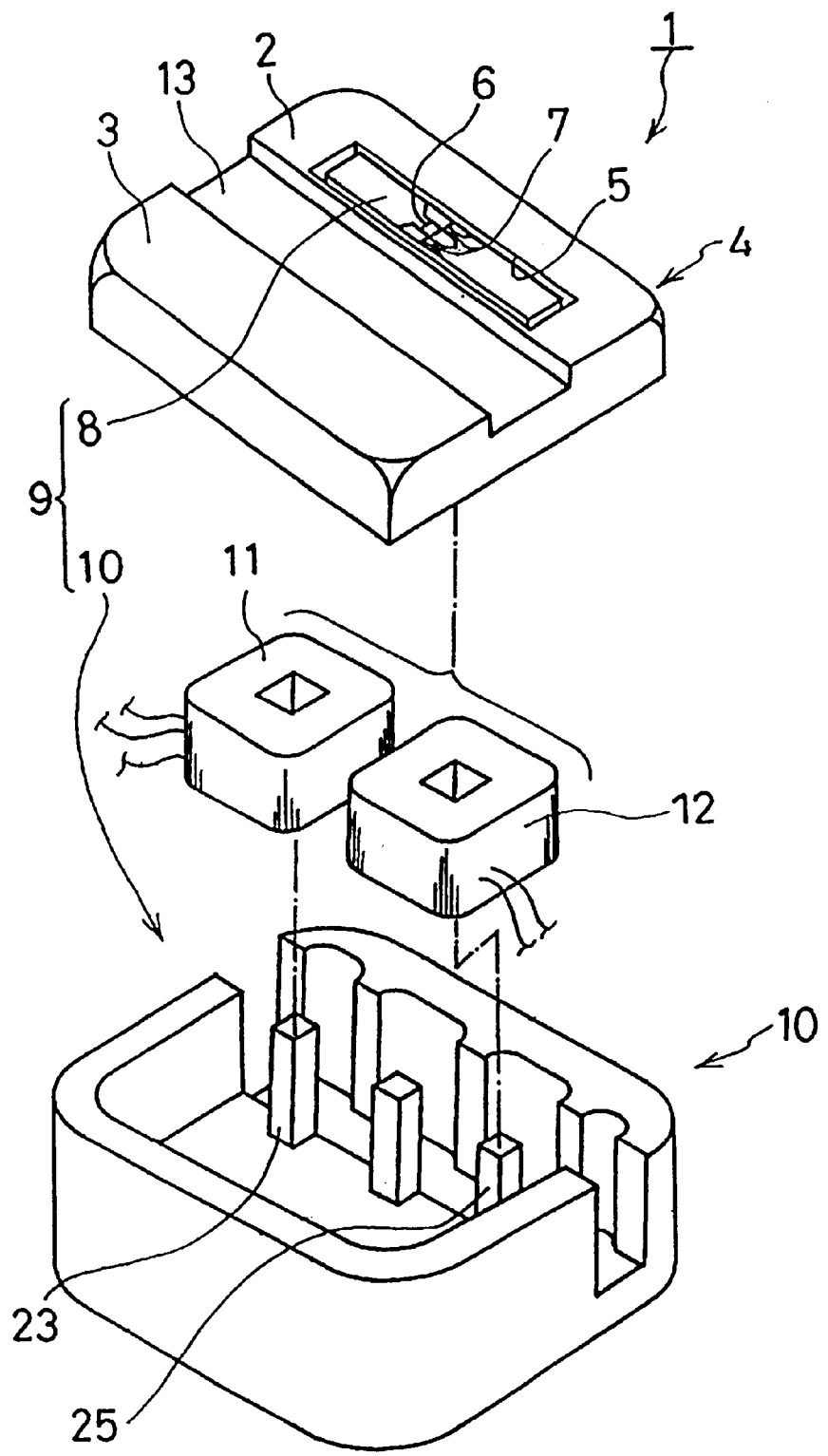
FIG. 9 is a broken and perspective view showing an example of a conventional magnetic head.
Figure 10:
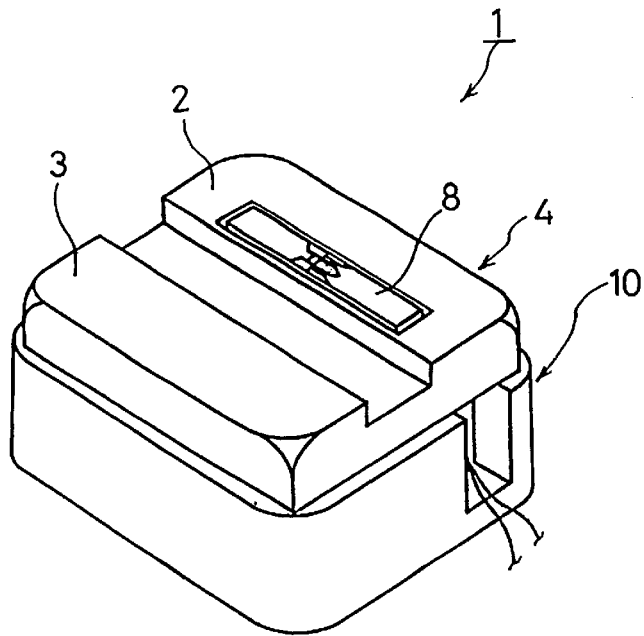
FIG. 10 is a perspective view showing the assembling state of the magnetic head of FIG. 9.
Figure 11:
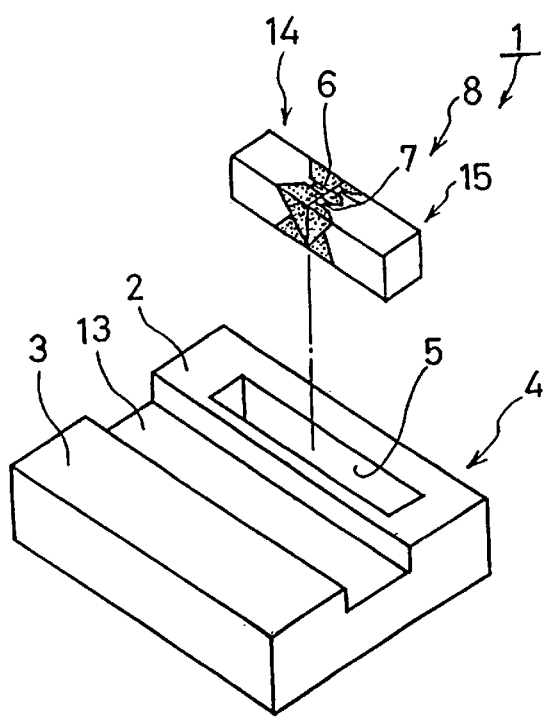
FIG. 11 is a broken and perspective view showing the slider and the front core of FIG. 9.
Figure 12:
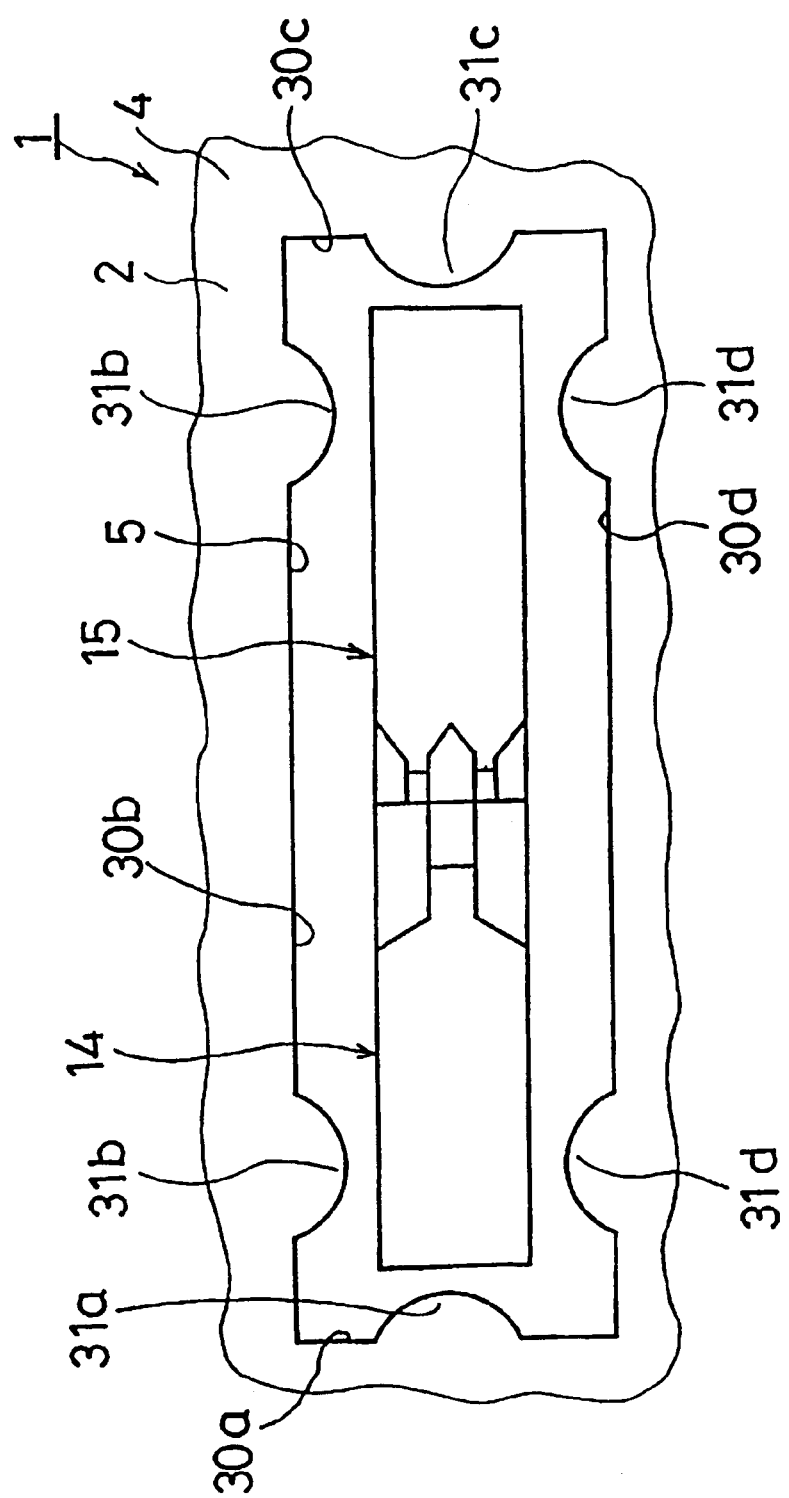
FIG. 12 is a plan view showing still another example of a conventional art of the magnetic head.

Hereinafter, a magnetic head 1 of a first embodiment of the present invention is explained based on FIGS. 1 and 2. For reference, the explanation and depicting of members and parts identical ones of corresponding to FIGS. 9 to 11 are omitted.

Figure 1:
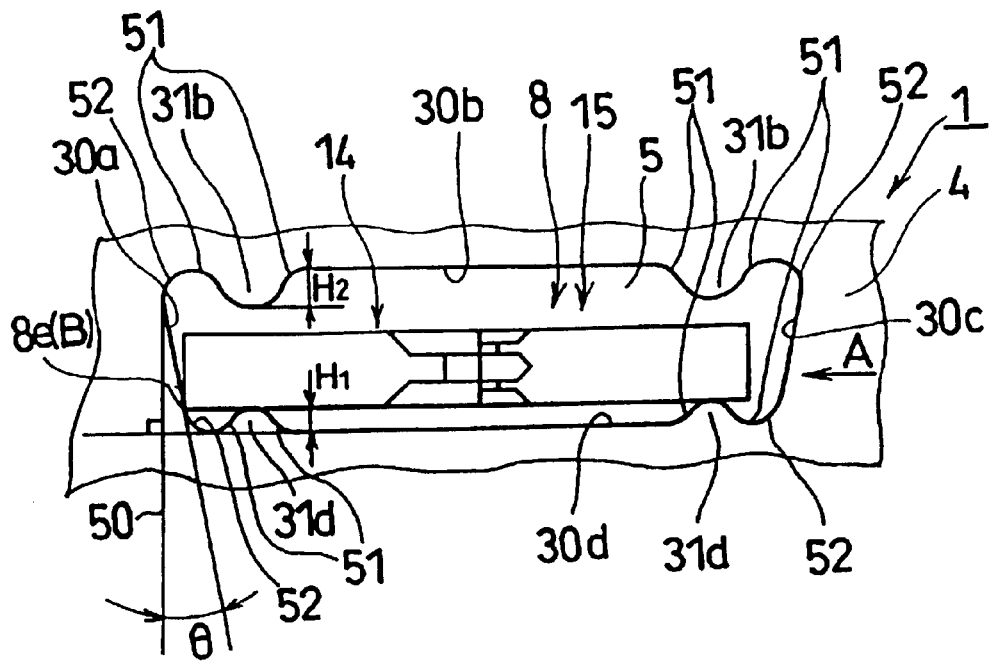
FIG. 1 is a plan view showing a main portion of the first embodiment of the magnetic head of the present invention.
Figure 2:
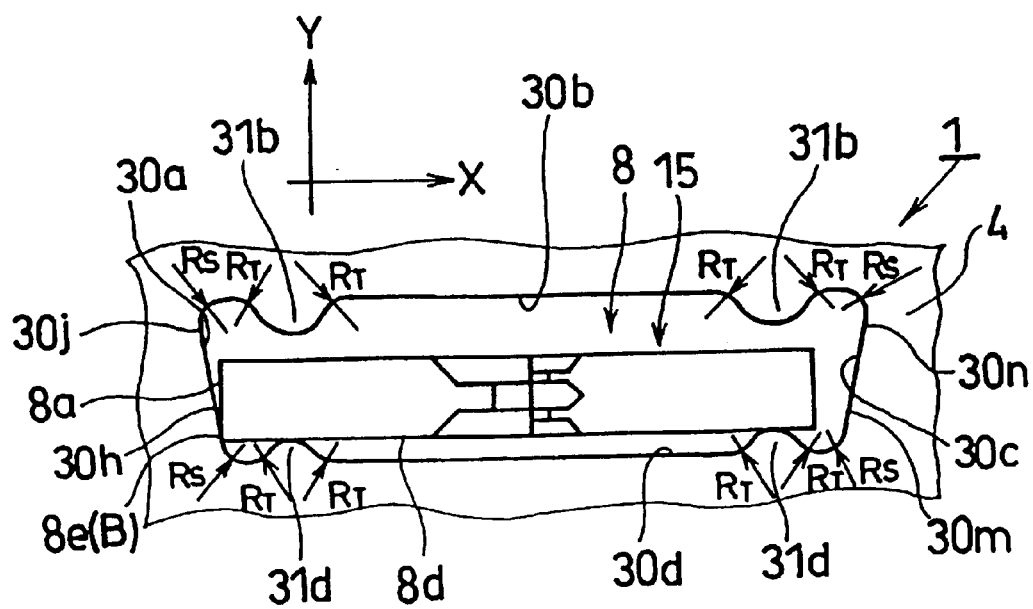
FIG. 2 is a plan view showing a radius curvature etc of the curvature portion of the magnetic head of FIG. 1.
Figure 13:
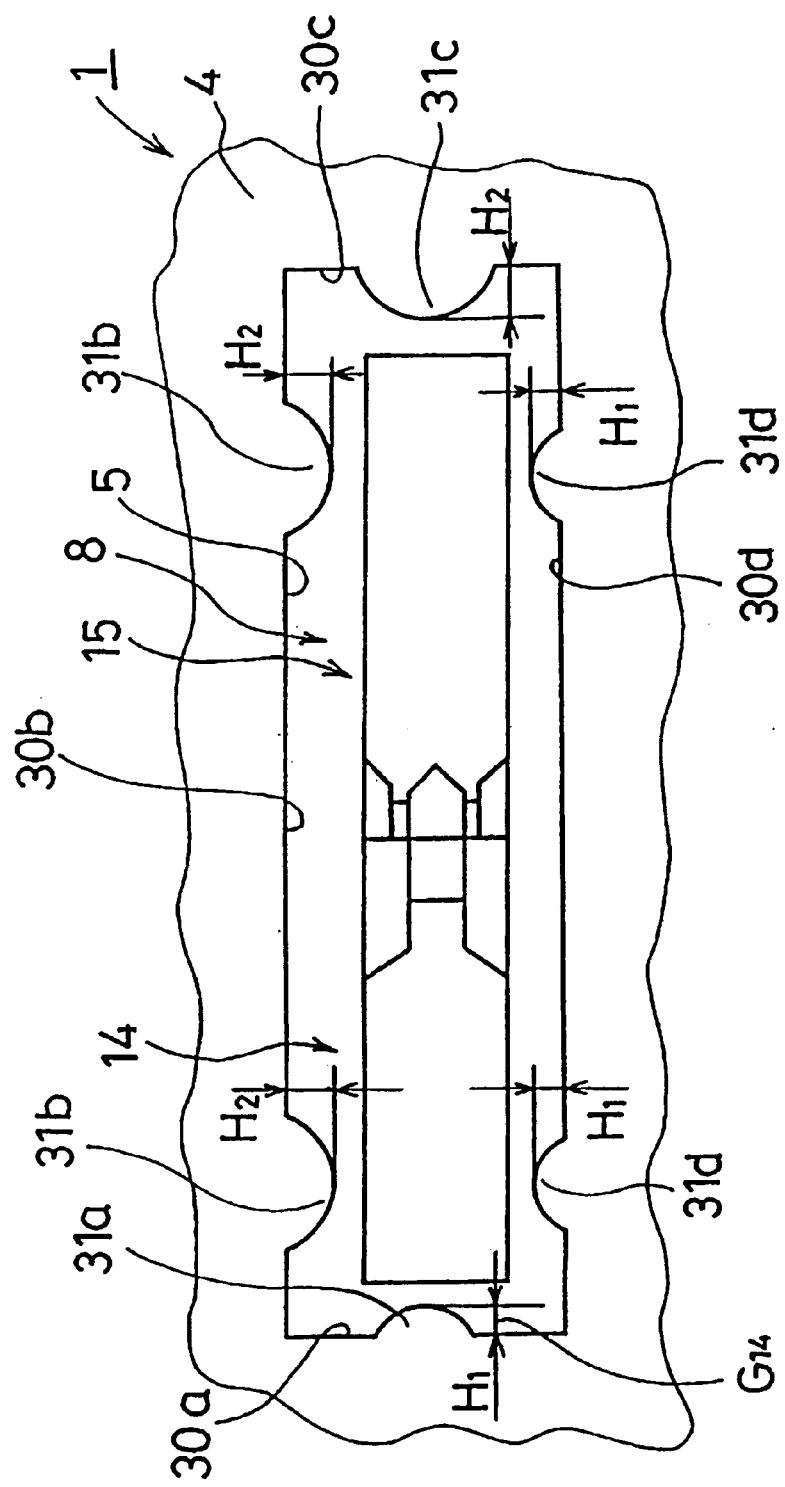
FIG. 13 is a plan view showing further another example of a conventional art of the magnetic head.

The magnetic head 1 of the first embodiment is greatly different comparing the magnetic head 1 shown in FIG. 13 in the point where, as shown in FIGS. 1 and 2, the projections of 30a and 30c of the first inner wall and the third inner wall (the short side wall) are gotten rid of and a given inclination (angle) against a vertical face 50 normal to the second inner wall and the fourth inner wall (the long side wall) 30b and 30d is given to those first and third inner walls 30a and 30c viewing from the sliding surface (a rail portion).

The magnetic head 1 of the first embodiment is greatly different comparing the magnetic head 1 shown in FIG. 13 in the point where, as shown in FIGS. 1 and 2, the projections 31a, 31c of the first inner wall 30a and the third inner wall 30c (the short side wall) are gotten rid of and a given inclination (angle) against a vertical face 50 normal to the second inner wall and the fourth inner wall (the long side wall) 30b and 30d is given to those first and third inner walls 30a and 30c viewing from the sliding surface (a rail portion).

To the second and the fourth inner walls 30b and 30d, two stripes of a second projection 31b and a fourth projection 31d are formed respectively. The height $H_1$ of the fourth projection 31d is made lower than the height $H_2$ of the second projection 31b ($H_1 < H_2$). In this embodiment, the case where the second and the fourth projections 31b and 31d are provided with two stripes respectively is illustrated, three stripes or more may be formed. The raised portions of the second and the fourth projections of the second and the fourth inner walls 30b and 30d are adapted to employ a smoothly curved curvature portion 51 at a radius curvature $R_T$ (in a magnetic head for a FDD, for instance $R_T$=0.05–0.2 mm).

Further, in the first and the third inner walls (short side wall) 30a and 30c, as described, any projection is not provided, which is different from the conventional art.

The first inner wall 30a is, in its fourth inner wall 30d side portion (hereinafter, for convenience' sake, referred to as" the first inner wall one side portion") 30h, inclined at a given angle θ (1–10 degrees) against a vertical face 50 which is normal to the long side walls (the second and the fourth inner walls 30b and 30d) in such a manner as it projects relatively toward the third inner side wall 30c comparing to the second inner wall 30b side portion (hereinafter, for convenience' sake referred to as "the first inner wall other side portion) 30j.

The third inner wall 30c is, in its fourth inner wall 30d side portion (hereinafter, for convenience' sake, referred to as" the third inner wall one side portion") 30m, inclined at a given angle θ (it may be equivalent to the above 1–10 degree) against a vertical face 50 which is normal to the long side walls (the second and the fourth inner walls 30b and 30d) in such a manner as it projects relatively toward the first inner side wall 30a comparing to the second inner wall 30b side portion (hereinafter, for convenience' sake referred to as "the third inner wall other side portion") 30n.

In addition, as to the four corners of the hole 5, for avoiding those from becoming edges, a roundness 52 of the radius curvature $R_s$ (a in a magnetic head for FDD, for instance, $R_s$=0.03–0.15 mm) is formed.

According to thus constituted magnetic head, on the respective inner wall of the long side wall, at lease two stripes of projections are formed, and between the front core 8 inserted in the hole 5 a gap for flowing a glass for sealing is secured.

Further, by making the height $H_1$ of the fourth projection 31d lower than the height $H_2$ of the second projection 31b, when the front core 8 is fixed with the glass for sealing, the front core 8 is adapted to be attracted toward the fourth projection 31d side having a smaller clearance to secure the positioning of the front core.

For reference, by using a later explained provisional holding agent the height $H_1$ of the fourth projection 31d and the height $H_2$ of the second projection 31b may be set identical [to avoid difference ($H_1<H_2$)].

Now, the positioning of the front core 8 to the hole 5 at the time of inserting (assembling time) is carried out by abutting the long side surface portion 8d (in FIG. 2 lower) one of the two long side surfaces (in FIG. 1, upper and lower) to the two stripes of fourth projection 31d and abutting the side portion 8e (in FIG. 1 extending in a direction penetrating the paper for FIG. 1) of the corner portion being formed with the short side surface portion 8a (in FIG. 2, left side) opposing to the first inner wall 30a and the short side surface 8d to the first inner wall 30a. In this case, it is adapted to position the front core 8 in such a manner as it is pushed toward A direction (axial X direction) and the provisional holding agent is applied near to said abutting portion (B portion) and to the fourth projection 31d.

Figure 14:
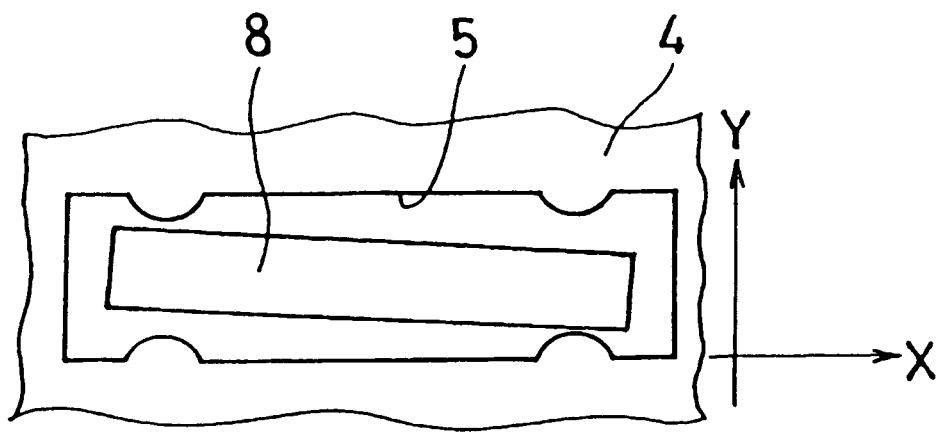
FIG. 14 is a plan view for explaining that the front core is inclined against the hole when being inserted in the hole of the slider.
Figure 15:
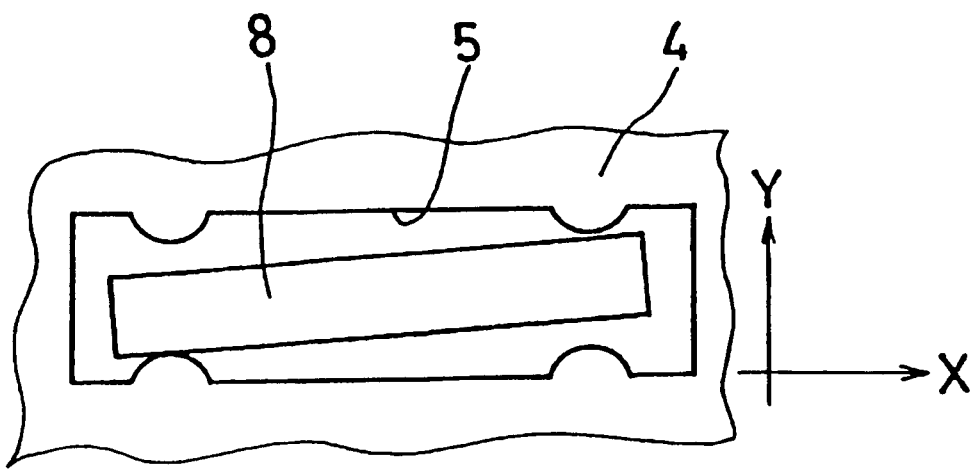
FIG. 15 is a plan view for explaining the case where the front core is inclined in a direction different from FIG. 14.

At the time of this positioning, due to an inclination of the first inner wall 30a at an angle of more than 1 degree to the vertical face 50, the side portion 8e of the front core 8 becomes to touch at one line with the first inner wall 30a (indicated in sign B in FIGS. 1 and 2), as shown in FIGS. 14 and 15, the front core 8 is prevented from being inclined to the hole 5 (X-axis) to enable the front core 8 to be positioned stably.

Further, due to the inclination of side surface 8a of the front core 8 and the first inner wall 30a to the vertical face 50 at such an angle more than one degree, between the short side surface 8a of the front core 8 and the first inner wall 30a, since an appropriate spacing where the glass from being filled is secured the insufficient flowing of the glass is not invited.

In this case, as shown above, since the front core 8 is pushed in an A direction (X axial direction), and to a portion near by the abutting portion (B portion) and to a portion near by the fourth projection 31d the provisional holding agent is applied, a stable positioning is carried out.

Further, since the inclination θ of the first inner wall 30a to the vertical face 50 is adapted to be less than 10 degrees, when assembling the front core 8, it is prevented from being displaced along the first inner wall 30a at the time of being positioned by being pushed from A direction, and positioning is carried out more securely. Further, by making the inclination θ of the first inner wall 30a to the vertical face 50 less than 10 degrees, since the size of the gap between the first inner wall 30a and the front core 8 is enabled to set less than a given value, a trouble generation which may be accompanied with an excessive expansion of the exposure surface of the glass can be controlled.

Since the raised portions of the second projection 31b and the fourth projection 31d are formed in a smoothly curved curvature portion 51, at the time of pulling out the mold after molding the slider 4 using the convex pin type of mold, an internal stress which is apt to be concentrated thereon can be avoided, thereby, the generation of defects or cracking are controlled, which is led to an increase of reliability, the degradation of fraction defective, increase of productivity and cost reduction.

Further, as shown, if the projections are provided on the first inner(short) wall 30a and the third inner (short) wall 30c, comparing with the second inner (long) wall 30b and the fourth inner wall (long) 30d, any damage or cracking is apt to be generated, but contrary to the conventional art, since the first inner wall (short wall) 30a and the third inner wall (short wall) 30c are not provided with the projections, any damage or cracking is controlled, and the reliability is increased, the degradation of fraction defective, the increase of productivity and the cost down are intended.

Further, due to the roundness 52 of each of 4 corners, at the time of molding and or working time, any internal stress is prevented from being concentrated. Thereby any damage or cracking is prevented, and more reliability can be increased.

Figure 3:
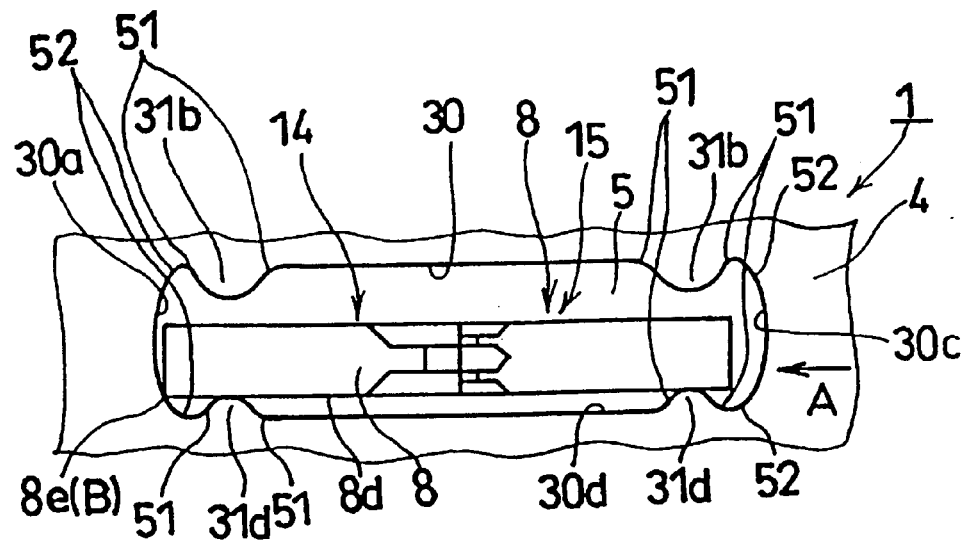
FIG. 3 is a plan view showing a main portion of the second embodiment of the magnetic head of the present invention.

In the magnetic head 1 of this second embodiment, comparing with said first embodiment (in FIGS. 1 and 2), the first inner wall 30a, and the third inner wall (short wall) 30c, as shown in FIG. 3, it is different that looks concave viewing from the sliding surface (the rail portion).

This embodiment of magnetic head 1, since the first inner wall 30a becomes concave figured at the time of inserting into the hole 5 of the slider 4 of the front core 8 and assembling, the side portion 8e of the front core 8 is adapted to become contact at one line (at B point) with the first inner wall 30a, and by pushing from A direction and applying the provisional holding agent around B point and the fourth projection 31d, a stable positioning can be defined.

Further, because the first inner wall 30a is configured concave, it is become possible to form the desired gap of the desired size between the front core 8 and the first inner wall 30a preferably, thereby insufficient filling of the glass is prevented.

Further, since the raised portions of the second projection 31b and the fourth projection 31d, are adapted to be smoothly curved curvature portion 51, as well as in the first embodiment, a generation of damage or cracking is controlled, which is led to the increase of reliability, the degradation of fraction defective, the increase of the productivity and the realization of cost down can be intended. Further, on the first inner wall (short side wall) 30a and the third wall (short side wall ) 30c there are no projections, so that as well as in the first embodiment, the increase of productivity and the realization of the cost down can be intended.

In place of the magnetic head 1 of the first embodiment (FIGS. 1 and 2), it may be formed as shown in FIGS. 4–7.

Figure 4:
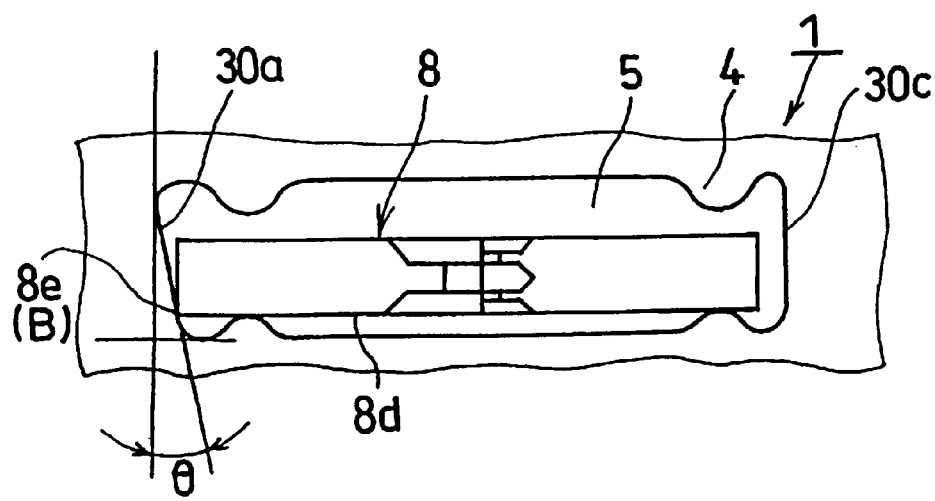
FIG. 4 is a plan view of a main portion of the third embodiment of the magnetic head of the present invention.

A magnetic head 1 of FIG. 4 (for convenience referred to as "the third embodiment") is different in that the third inner wall 30c is parallel with the vertical face 50 comparing with the magnetic head 1 of the first embodiment.

Figure 5:
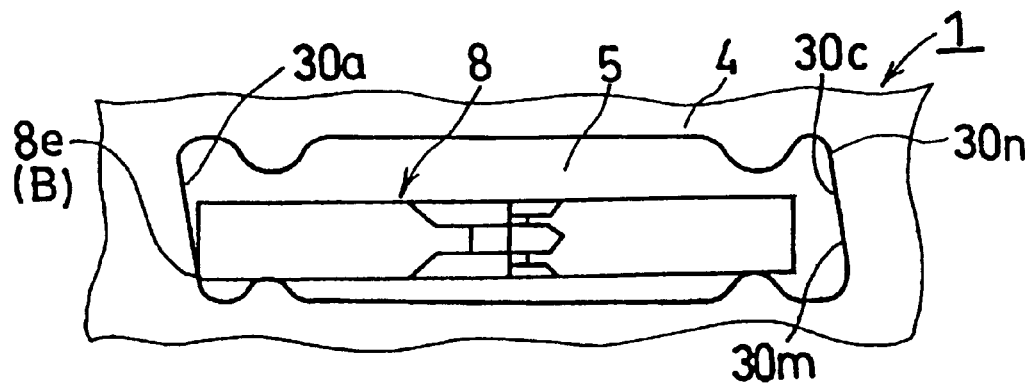
FIG. 5 is a plan view of a main portion of the fourth embodiment of the magnetic head of the present invention.

The magnetic head 1 of FIG. 5 (for convenience, referred to as "the fourth embodiment") is different in that the third inner wall other side portion 30n of the third inner wall 30c is comparing with the third inner wall one side portion 30m of the third inner wall projected mutually toward the third inner wall 30a side and has an inclination of a given angle θ (it may be equivalent θ:1–10 degrees) to the vertical face 50.

Figure 6:
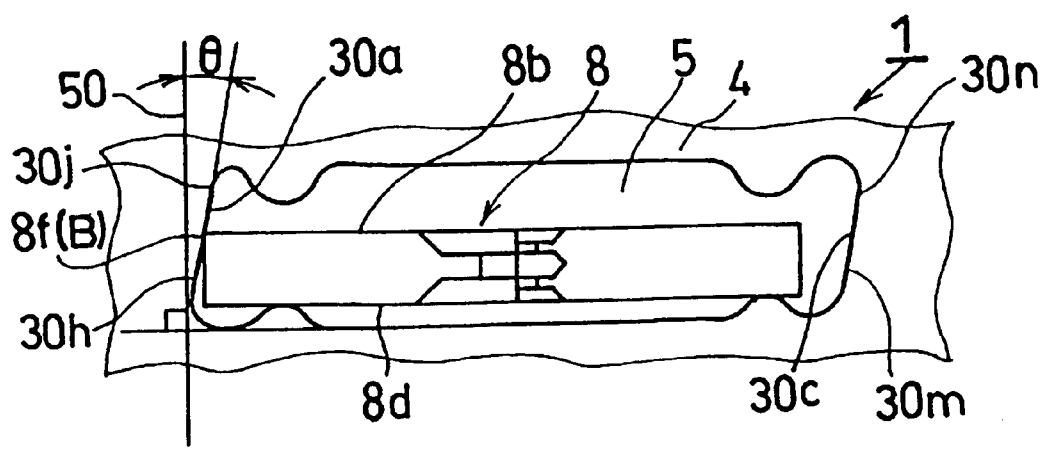
FIG. 6 is a plan view showing a main portion of the fifth embodiment of the magnetic head of the present invention.

The magnetic head 1 of FIG. 6 (for convenience, referred to as "the fifth embodiment") is different, comparing with the magnetic head 1 of the first embodiment, in that, while the first inner wall other side portion 30j of the first inner wall 30a is comparing with the first inner wall one side portion 30h mutually projected toward the third inner wall 30c side, the first inner wall 30a has an inclination of a given angle θ (1–10 degrees) to the vertical face 50, and by abutting the side portion 8f (in FIG. 6, extending in penetrating the paper of FIG. 6) of the corner portion formed with the short side portion 8a (in FIG. 1 left) opposing to the first inner wall 30a and other side long side portion 8b (in FIG. 6, upper) to the first inner wall 30a, the positioning is adapted to be defined.

Figure 7:
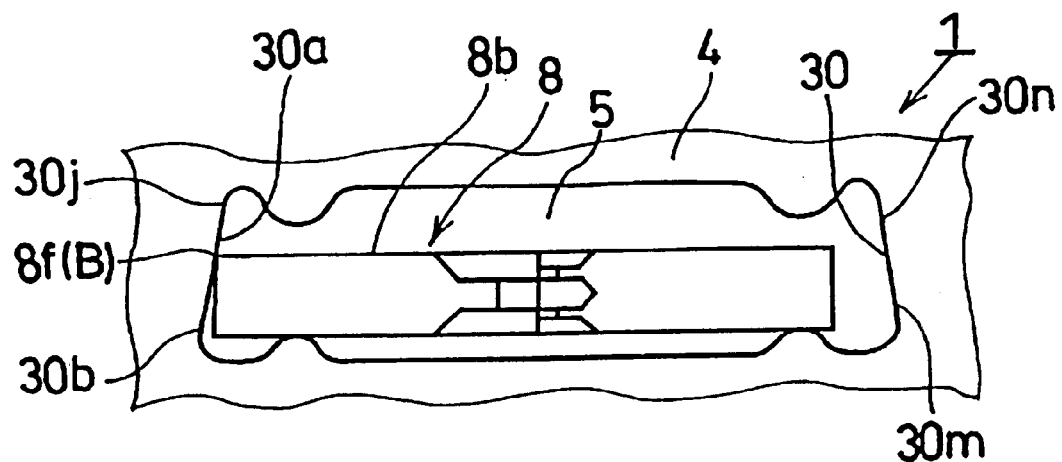
FIG. 7 is a plan view showing a main portion of the sixth embodiment of the magnetic head of the present invention.

The magnetic head 1 of FIG. 7 (for convenience, referred to as "the sixth embodiment") is, comparing with the magnetic head 1 of the first embodiment, different in that as to the first inner wall 30a it is formed as well as in the magnetic head 1 of FIG. 6, and as to the third inner wall 30c, while the third inner wall other side portion 30n being projected mutually against the third inner wall one side portion 30m toward the first inner wall 30a side, it is inclined at an angle θ (it may be equivalent to the above θ, 1–10 degrees) against the vertical face 50.

Figure 8:
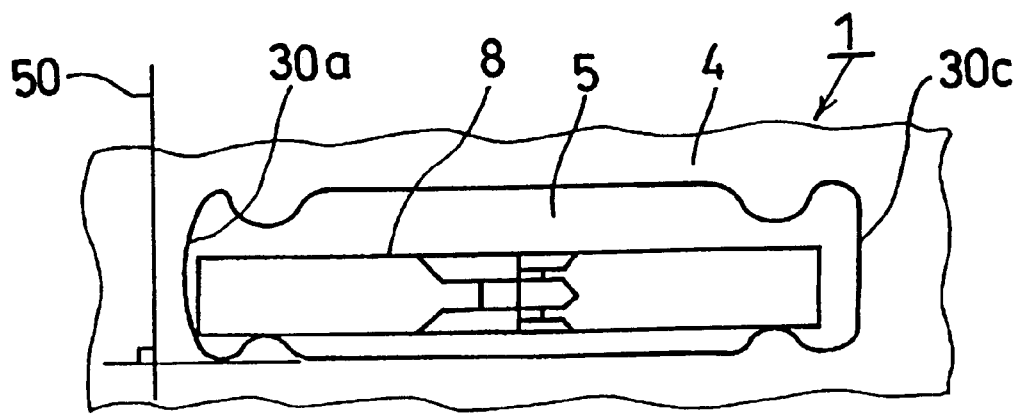
FIG. 8 is a plan view showing a main portion of seventh embodiment of the magnetic head of the present invention.

Further, in place of the magnetic head 1 of FIG. 3 (the second embodiment), as shown in FIG. 8, the magnetic head 1 may be formed by making the third inner wall 30c parallel with the vertical face 50 (for reference referred to as "the seventh embodiment")

According to the first aspect of the present invention, since, by providing projection formed on the long side wall, at the time of inserting the slider of the front core into the hole an appropriate gap is formed between the front core and the long side wall, and also to the short side wall having a given inclination against the vertical face the side portion of the corner of the front core is enabled to be abutted with a line, so that the front core can be appropriately positioned to the hole of the slider and an appropriate gap is formed between the short side wall and the front core to be assembled preferably while controlling the amount of sealing agent.

According to the second aspect of the present invention, since the first inner wall is inclined at an angle of more than 1 degree and between the first inner wall and the front core an appropriate gap for flowing of the sealing agent is secured, there is no deficit of filling glass. Since the inclination of the first inner wall against the vertical face is made below 10 degrees, at the time of assembling of the front core when assembling the front core, due to pushing one of the side portion of corners of the front core to the first inner wall, the front core is not displaced, to that extent, the positioning is carried out securely.

According to the third aspect of the present invention, since between the first inner wall and the front core an appropriate gap for being flown with the sealing agent is secured, there is no risk of generating of surplus or deficit amount of sealing agent. When the front core is inserted and assembled in the hole of the slider, one side of the front core can be abutted at a line to the first inner wall, thereby the front core is prevented from being displaced along the first inner wall, to that extent the positioning is securely carried out.

According to the fourth aspect of the present invention, since the raised portions of the projections are formed smoothly curved to form a curvature portion, it enables to prevent from being concentrated with an internal stress to such a curvature portion at the time of extracting a die after molding a slider etc., thereby any damage or cracking is controlled, and it is intended to increase the reliability, reduce the degradation of the rate of defective product, increase the productivity and realize the cost down.

According to the fifth aspect of the present invention, the front core is configured approximately rectangular in plan view, and is inserted in the hole in mating with its longitudinal direction, at the time of insertion in the hole of the slider of the front core, one of the four sides extending upper and lower is positioned against the vertical face inclined short side walls or concave short sides by being abutted thereto, thereby the front core is possible to be prevented from being displaced along the short sides wall, to that extent the positioning is secured.

What is claimed is:

1. In a magnetic head comprising a slider having a rail sliding a magnetic recording medium, an approximately rectangular hole formed in the slider corresponding to the rail, a front core one portion of which is sealed in the hole and having an operation gap, a back yoke forming the head core with the front core and provided with a recording and a reproducing coil, and an erasing coil, the magnetic head is characterized in that long side walls of four inner walls forming the hole have at least two stripes of projections extending in a direction of coming through the hole, and at least one of two short side walls is inclined at a given angle to the vertical face normal to the long side wall.

2. A magnetic head according to claim 1, wherein the given angle is defined between from 1 to 10 degrees.

3. In a magnetic head comprising a slider having a rail sliding a magnetic recording medium, an approximately rectangular hole formed in the slider corresponding to the rail, a front core one portion of which is sealed in the hole and having an operation gap, a back yoke forming the head core with the front core and provided with a recording and a reproducing coil, and an erasing coil, the magnetic head is characterized in that long side walls of four inner walls forming the hole have at least two stripes of projections extending in a direction coming through the hole, and at least one of two short side walls is configured concave.

4. A magnetic head according to claim 1, wherein, a raised portion of the projections of the long side walls are formed with a curvature portion smoothly curved.

5. A magnetic head according to claim 1, wherein the front core is configured approximately rectangular, and inserted in the hole in mating with a longitudinal direction of the hole, and when being inserted, one of side portions which includes respectively one of four corners and extending upwardly and downwardly is adapted to be abutted and positioned.

6. A magnetic head according to claim 2, wherein, a raised portion of the projections of the long side walls are formed with a curvature portion smoothly curved.

7. A magnetic head according to claim 3, wherein, a raised portion of the projections of the long side walls are formed with a curvature portion smoothly curved.

8. A magnetic head according to claim 2, wherein the front core is configured approximately rectangular, and inserted in the hole in mating with a longitudinal direction of the hole, and when being inserted, one of side portions which includes respectively one of four corners and extending upwardly and downwardly is adapted to be abutted and positioned.

9. A magnetic head according to claim 3, wherein the front core is configured approximately rectangular, and inserted in the hole in mating with a longitudinal direction of the hole, and when being inserted, one of side portions which includes respectively one of four corners and extending upwardly and downwardly is adapted to be abutted and positioned.

10. A magnetic head according to claim 4, wherein the front core is configured approximately rectangular, and inserted in the hole in mating with a longitudinal direction of the hole, and when being inserted, one of side portions which includes respectively one of four corners and extending upwardly and downwardly is adapted to be abutted and positioned.

\* \* \* \* \*